(No Model.)
D. Y. HALLOCK.
DEVICE FOR FEEDING AND WATERING POULTRY.
No. 414,405. Patented Nov. 5, 1889.
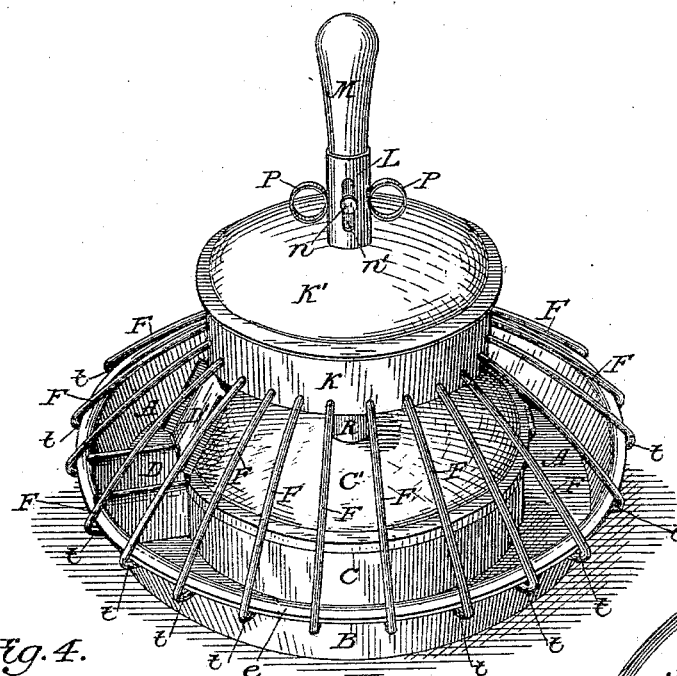
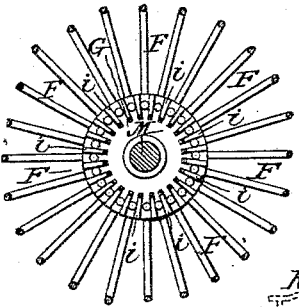
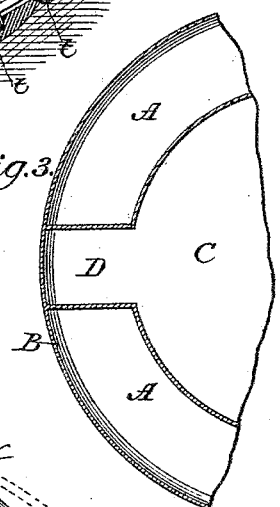
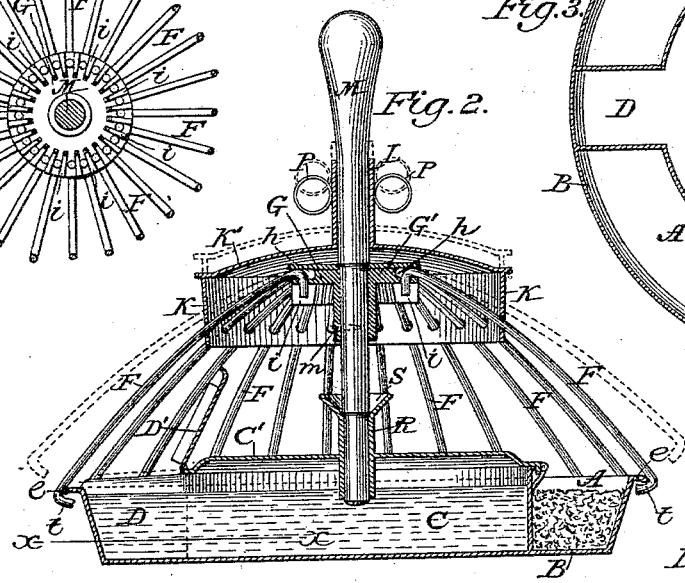
Attest:
A. N. Jeshra.
E. M. Watson.
Inventor:
Daniel Y. Hallock
By David A. Burr
Atty

United States Patent Office.

DANIEL Y. HALLOCK, OF SOUTHOLD, NEW YORK.

DEVICE FOR FEEDING AND WATERING POULTRY.

SPECIFICATION forming part of Letters Patent No. 414,405, dated November 5, 1889.

Application filed April 17, 1889. Serial No. 307,526. (No model.)

*To all whom it may concern:*

Be it known that I, DANIEL Y. HALLOCK, of Southold, in the county of Suffolk and State of New York, have invented certain new and useful Improvements in Devices for Feeding and Watering Poultry; and I do hereby declare that the following is a full and exact description thereof, reference being had to the accompanying drawings, and to the letters of reference marked thereon, making a part of this specification.

This invention relates to devices for feeding and watering poultry, and has for its object to furnish in a neat, convenient, portable form a receptacle in which any description of soft feed or of grain for fowls may be exposed within their reach in a manner to prevent them from wasting or soiling it, and in connection therewith to provide a water-supply for drinking purposes in a compartment of the same receptacle.

It consists in the combination and arrangement of devices for said purposes, substantially as hereinafter described and claimed.

In the accompanying drawings, Figure 1 is a view in perspective of my improved poultry-feeder; Fig. 2, a central vertical section thereof in line through the outward extension of the central water-space; Fig. 3, a detailed transverse section on line *x x* of Fig. 2, and Fig. 4 a detached bottom view of the head of the wire grating.

The feed-receptacle consists of an annular trough A, formed about the inner periphery of a pan B by the concentric wall of an inner circular compartment C, reserved as a water-fountain. This central inner water-space C is made to extend outwardly at one or more places across the annular trough A to the outside rim of the pan or dish B, and these outward extensions of the central space serve as radial drinking cups or compartments D in the annular feed-receptacle A. The central water-space is covered with a top plate C', hinged or otherwise fitted thereto, so as to admit of being thrown open to receive the water therein, and each of the extensions thereof or drinking-cups D communicating therewith is likewise provided with a hinged lid D', so that it may be closed when food is being placed in the annular trough, the lid being thrown open when the device is in use.

The pan B is formed with an outer beaded rim or curved edge *e*, to afford a hold for the inwardly-bent ends of a series of wires F F F, radiating from a central head G, to serve as a screen or grating over the receptacle, the width of the spaces between the wires being so proportioned as to permit a fowl or chick to readily reach the feed and yet prevent it from getting into the pan.

The head G consists of a centrally-perforated casting or block encircled by a collar *h*, formed integrally therewith and having a series of holes formed transversely therein, near its rim, to register with the spaces between a series of radial partition-plates or fingers *i i*, encircling the head under the collar and corresponding in number with the wires F F of the screen. The upper end of each wire F is bent into a hook, which is passed through one of said apertures into the radial recess, as shown in Fig. 2 of the drawings, to secure it to the head and yet permit of a slight radial oscillating movement of the wire. After the wires have been inserted in the head they are confined by means of an outer annular plate G', held down thereon by means of a shoulder upon a central rod or handle M, made to pass through the head, and which is made fast thereto by a lateral screw or pin *m*. The wires F F are made to extend severally from the head through an annular plate K, depending vertically from the rim of a circular plate K', which is secured to a central sleeve L, fitted loosely upon the rod M above the head G.

The sleeve L serves as an independent handle for the plate K, and it is prevented from revolving independently of the central rod or handle M, and its longitudinal play or movement thereon is limited by means of a pin *n*, projecting laterally from said central handle through a longitudinal slot *n'* in said sleeve L.

To facilitate taking hold of the tubular handle or sleeve L, in order to lift it upon the central rod M, rings P P are secured upon the sleeve at diametrically-opposite points, through which to insert the fingers when it is desired to lift the screen off of the pan.

The lower end of the central rod or handle M is extended so as to project into a central aperture in the cover of the water-receptacle, this aperture being preferably fitted with a collar R to afford an extended bearing which shall steady the rod and attached screen when in use. This collar R may also be provided with an outwardly-flaring flange S at its upper outer end to facilitate entering the lower end of the rod M into the collar.

It is evident that by lifting the tubular-sleeve L the wires F F radiating from the head G will be drawn upward by means of the annular-plate K, through which they pass, because of the overbalancing weight of the head G upon their inner ends, the upward movement being limited by the length of the slot $n'$ in the sleeve, and that as the wires are lifted upwardly at their intersection with the annular plate L their outer ends will be caused to spread apart radially. These outer ends are each bent inwardly to form hooks $t\ t$, which, when the tubular handle L, carrying the annular plate K, is normally depressed by its gravity, so as to allow and cause them to spring inwardly, will pass under and firmly engage the rim of the pan B, as shown in Fig. 1, being disengaged therefrom by simply lifting the handle L to cause their outward movement in manner, as described. Hence by lifting said tubular handle L the screen F F will be automatically detached and removed from the pan; but by lifting the central handle M the pan B and its contents will be lifted with the screen, so that the entire device may thus be readily moved or carried from place to place.

I claim as my invention—

1. The combination, in a device for feeding and watering poultry, with a pan having a central covered water-compartment encircled by a concentric open feed-compartment, of one or more radial drinking-cups formed in said feed-compartment and communicating with the central water-compartment, substantially in the manner and for the purpose herein set forth.

2. The combination, in a device for feeding and watering poultry, with a pan having a central covered water-compartment encircled by a concentric open feed-compartment, and provided with one or more radial drinking-cups formed in said feed-compartment and communicating with said water-compartment, of a series of wires radiating from a central rod to form a screen over the pan and whose lower ends are made to spring inward into engagement with the rim of the pan, substantially in the manner and for the purpose herein set forth.

3. The combination, with a circular feed-pan, substantially as described, and with a series of wires radiating from a common center to clasp with their lower ends the rim of the pan and form a screen above it, of a central tubular head to which the upper ends of said wires are hinged, a central rod made fast to said head, a tubular handle playing upon the rod above the head, and an annular plate of enlarged diameter secured concentrically to the tubular handle to intersect the wires and through which they freely pass, whereby a movement of the tubular handle upon the central rod will operate to spread apart the wires and disengage them from the pan, substantially in the manner and for the purpose herein set forth.

In testimony whereof I have signed my name to this specification in the presence of two subscribing witnesses.

DANIEL Y. HALLOCK.

Witnesses:
A. N. JESBERA,
E. M. WATSON.